United States Patent [19]

Takamiya et al.

[11] 4,081,834
[45] Mar. 28, 1978

[54] SYSTEM FOR COMPENSATING JITTER OF VIDEO SIGNAL

[75] Inventors: Tadashi Takamiya, Nakaminato; Yasufumi Yumde, Yokohama, both of Japan

[73] Assignee: Hitachi, Ltd., Japan

[21] Appl. No.: 698,519

[22] Filed: Jun. 22, 1976

[30] Foreign Application Priority Data

Jun. 24, 1975 Japan .................................. 50-78865

[51] Int. Cl.² .......................... H04N 5/04; H04N 5/78; H04N 5/76
[52] U.S. Cl. ...................................... 358/158; 360/36; 358/8
[58] Field of Search .................... 358/127, 158, 159, 8; 360/36; 331/20, 25; 328/159

[56] References Cited

U.S. PATENT DOCUMENTS

| | | | |
|---|---|---|---|
| 3,676,583 | 7/1972 | Morita et al. | 360/36 |
| 3,681,522 | 8/1972 | Tanabe | 360/36 |
| 3,781,470 | 12/1973 | Horn | 358/158 |

Primary Examiner—Robert L. Griffin
Assistant Examiner—Aristotelis M. Psitos
Attorney, Agent, or Firm—Craig & Antonelli

[57] ABSTRACT

A horizontal synchronizing signal contained in a composite video signal undergoing a phase fluctuation is phase modulated and substituted for the original horizontal synchronizing signal. The phase modulation of the horizontal synchronizing signal of the input signal is effected at a phase modulation circuit and then the phase modulated signal is applied to an AFC circuit unit which has the same transfer characteristic as that of a horizontal AFC circuit of an ordinary television receiver set. The phase modulation circuit is controlled by a signal in response to a phase difference between the output of the AFC circuit unit and the original horizontal synchronizing signal. A composite video signal containing the horizontal synchronizing signal subjected to the phase modulation in this manner is applied to the television receiver set, thereby displaying a picture image free from the fluctuation.

4 Claims, 6 Drawing Figures

SYSTEM FOR COMPENSATING JITTER OF VIDEO SIGNAL

BACKGROUND OF THE INVENTION

1. Field of the Invention

The invention relates to a system wherein a phase fluctuation contained in a video signal is compensated to suppress the jitter of the video signal, and more particularly to a system for suppressing the jitter of a picture image being reproduced from a video signal which is read out from a rotatable or transportable recording medium recorded with the video signal such as a video tape recorder, video disc player or the like device.

2. Description of the Prior Art

Various systems have higherto been proposed which compensate phase flucturations contained in a signal read out from a video signal recording and reproducing device. In one typical type, a phase fluctuation of the horizontal synchronizing signal contained in the video signal is detected and a voltage controlled variable delay line is controlled by the detected signal so that the video signal passing through the voltage controlled variable delay line is so delayed as to cancel out the phase fluctuation In another type, a clock controlled analog memory is used and a video signal is passed therethrough so that the writing and reading speeds or timings for the video signal can be controlled by a clock frequency or writing and reading timing both corresponding to a phase fluctuation of the horizontal synchronizing signal. However, in order to obtain satisfactory performance with these conventional systems, the former required a greatly long delay line consisting of a lot of element and the latter a memory having a large storage capacity, along with many other circuit elements, resulting in high manufacturing cost preventing public recording and reproducing devices from being availed for practical use. A countermeasure for reducing the horizontal fluctuation associated with the reproduced picture image without using these expensive systems has also been proposed wherein a television receiver set for displaying a reproduced picture image is given ability for widening the amplitude and phase transmission characteristic against the fluctuation frequency associated with the input signal delivered to the horizontal AFC circuit incorporated in this television receiver set. This countermeasure, however, is incompatible with conditions for ensuring stability of the picture image against noises contained in the reception of broadcasting signals with the result that the television receiver set for displaying the reproduced signal of the recording and reproducing device needs to be added with function to change the characteristic of the horizontal AFC circuit. Further, the television receiver set with such additional characteristic change function is not popular and for this reason, the wide utilization of video players such as video tape recorders or video disc players is prevented.

SUMMARY OF THE INVENTION

An object of this invention is to provide a simple system for compensating the phase fluctuation of the video signal.

Another object of this invention is to provide an economical system for compensating phase fluctuations capable of effectively suppressing a phase fluctuation contained in a reproduced signal of a video signal recording and reproducing device.

Yet another object of this invention is to provide a system for compensating phase fluctuations which is realized without altering a television receiver set for displaying reproduced picture images.

According to this invention, a horizontal synchronizing signal of a composite video signal accompanied with a phase fluctuation is phase modulated by a phase modulating means incorporated with an AFC circuit unit which has the same transfer characteristic as that of an AFC circuit for a television receiver set, so that only the horizontal synchronizing signal component is subjected to phase shift and thus the phase fluctuation is absorbed by the AFC circuit for the television receiver set, and then the phase-fluctuation-free horizontal synchronizing signal is applied to the television receiver set as a video monitor. More particularly, according to this invention, only a horizontal synchronizing signal of a composite video signal accompanied with a phase fluctuation is phase modulated at a phase modulation circuit, the phase modulated horizontal synchronizing signal is applied to an AFC circuit unit having the same transmission characteristic as that of an AFC circuit for an ordinary television receiver set, the output signal of the AFC circuit unit is compared in phase with the input horizontal synchronizing signal applied to the phase modulation circuit, and the phase modulation circuit is controlled by a signal in response to the phase difference. The phase modulated horizontal synchronizing signal delivered from the phase modulation circuit is added to the video signal accompanied with the phase fluctuations, and the resultant signal is applied to the television receiver set.

In this manner, it is possible to widen apparently the amplitude and phase transfer characteristic of the horizontal AFC circuit against the phase fluctuation frequency without altering the television receiver set. Consequently, the response to the phase fluctuation is improved, thereby a picture image free from jitter being obtained.

BRIEF DESCRIPTION OF THE DRAWINGS

Further objects and features of this invention will be understood from the following detailed description taken in conjunction with the accompanying drawings in which.

DESCRIPTION OF THE PREFERRED EMBODIMENT

Figure 1:
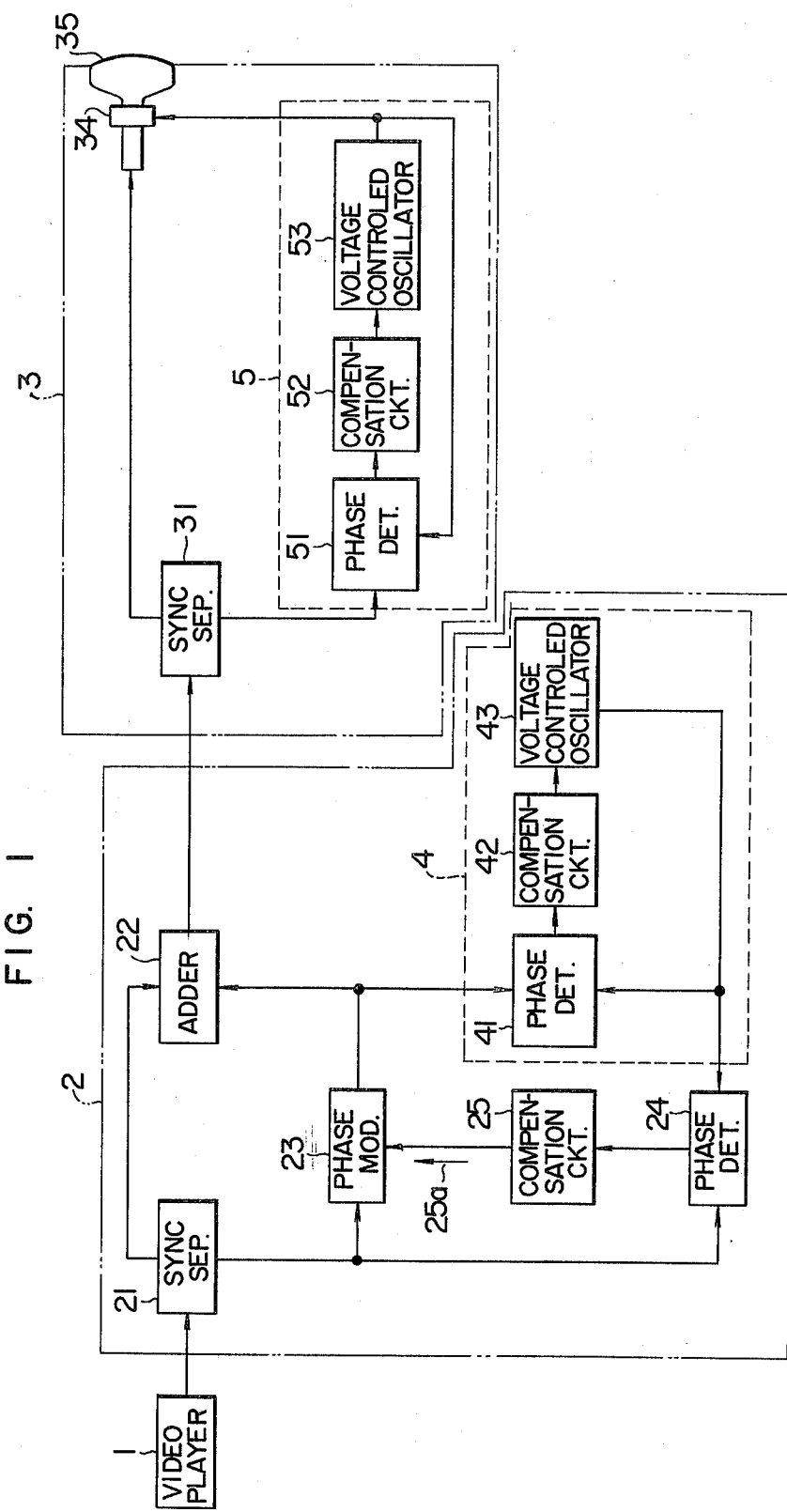
FIG. 1 is a block diagram of a phase fluctuation compensating system embodying this invention and a television receiver set coupled therewith.

Referring now to FIG. 1, there is shown a schematic block diagram of a system for compensating a phase fluctuation of a picture image embodying this invention. In the figure, reference numeral 1 designates a video player which reproduces a composite video signal recorded in a video tape recorder or a video disc player. Such a composite video signal reproduced by the video player 1 as accompanied with a phase fluctuation is first applied to a phase fluctuation compensator 2. This composite video signal applied to a synchronizing signal separator circuit 21 of the phase fluctuation compensator 2 is separated into a video signal and a horizontal synchronizing signal by slicing it at the pedestal level.

The separated horizontal synchronizing signal is subjected to a modulation with respect to its time axis at a phase modulator circuit 23 and then transmitted to a video synchronizing signal adder 22 to be synthesized with the previously separated video signal thereat, thereby producing again a composite video signal which in turn is applied to a television receiver set 3. The phase modulator circuit 23 adapted to effect the phase modulation of the horizontal synchronizing signal by receiving a modulation signal 25a can be materialized in principle, for example, in the form of a one-shot multivibrator. Namely, by applying a triggering signal of the original horizontal synchronizing signal to the input of the one-shot multivibrator and by changing an intended charging voltage of a capacitor which determines the time constant of the one-shot multivibrator by using the modulation signal 25a, the recovery time of the one-shot multivibrator can be changed thereby to produce a pulse train undergoing the phase modulation dependent upon the modulation signal 25a.

The phase modulated horizontal synchronizing signal is also applied to a horizontal AFC circuit unit 4 having the same transfer characteristic as that of a horizontal AFC circuit of an ordinary television receiver set. The horizontal AFC circuit unit 4, just like an ordinary horizontal deflection circuit, includes a phase detection circuit 41, a compensation circuit 42 and a voltage controlled oscillator 43. The voltage controlled oscillator 43 produces an artificial horizontal deflection signal synchronized with the input signal thereto. This output signal is transmitted to a horizontal phase difference detection circuit 24 to be compared in phase with the horizontal synchronizing signal applied thereto so that a phase difference signal proportional to a resultant phase difference may be delivered from the horizontal phase difference detection circuit 24. The horizontal phase difference detection circuit 24 may be realized as a sample-hold circuit wherein the artificial horizontal deflection signal of, for example, a saw tooth waveform is sample-held by horizontal synchronizing pulses comprised by the input horizontal synchronizing signal.

The phase difference signal thus produced is applied, as the modulation signal, to the phase modulator circuit 23 through a compensation circuit 25 having a transfer characteristic of K(s). The composite video signal compensated for its phase fluctuation regarding the horizontal synchronizing signal in this manner is applied to the television receiver set 3.

When applying the composite video signal to the television receiver set 3, where the video signal is converted into a high frequency signal and then transmitted to the television receiver set 3 through a tuner, it is necessary to provide an RF converter (not shown) subsequent to the video synchronizing signal adder 22, which RF converter is operable with a VHF or UHF carrier wave. In such case, since the transmission of the composite video signal relies merely on the carrier wave, the same effect as this invention is attainable in a simmilar manner.

A tuner, an intermediate frequency circuit, a video detection circuit and an audio circuit to be incorporated in the television receiver set 3 shown in FIG. 1 are not illustrated herein, as being well known and not directly related to the feature of this invention.

The composite video signal applied to the television receiver set 3 is separated into the video signal and the horizontal synchronizing signal at a synchronizing signal separation circuit 31. The separated video signal is applied to cathode ray tube 35 through a signal processing circuit not shown.

The separated horizontal synchronizing signal, on the other hand, drives a horizontal AFC circuit unit 5 to produce a horizontal deflection signal which in turn is applied to a horizontal deflection coil 34 of the cathode ray tube 35. The horizontal AFC circuit unit 5 includes a phase detection circuit 51, a compensation circuit 52 and a voltage controlled oscillator 53. It will be appreciated that no phase fluctuations due to the low frequency in the order of the vertical synchronizing signal frequency are not attacked by the present inventions and, therefore, those circuits for vertical synchronizing and vertical deflection which are not related to the invention directly are omitted in FIG. 1.

With reference to a system of FIG. 1, consider a composite video signal from the video player 1 having a phase fluctuation expressible by $\phi_1(t)$ with respect to the time axis $t$. It is assumed that the horizontal synchronizing signal is phase modulated at the phase modulator circuit 23 to have a phase fluctuation expressible by $\phi_2(t)$, the artificial horizontal deflection signal from the horizontal AFC circuit unit 4 has a phase fluctuation expressible by $\phi_3(t)$, and the horizontal deflection signal having passed through the horizontal AFC circuit unit 5 for the television receiver set 3 has a phase fluctuation expressible by $\phi_4(t)$. The video signal to be applied to the cathode ray tube 35 has the same phase fluctuation of $\phi_1(t)$ as that of the input signal to the synchronizing signal separator circuit 21 and it follows that a picture image to be displayed on the cathode ray tube 35 undergoes a phase fluctuation of $100_1(t) - \phi_4(t)$.

Figure 2:
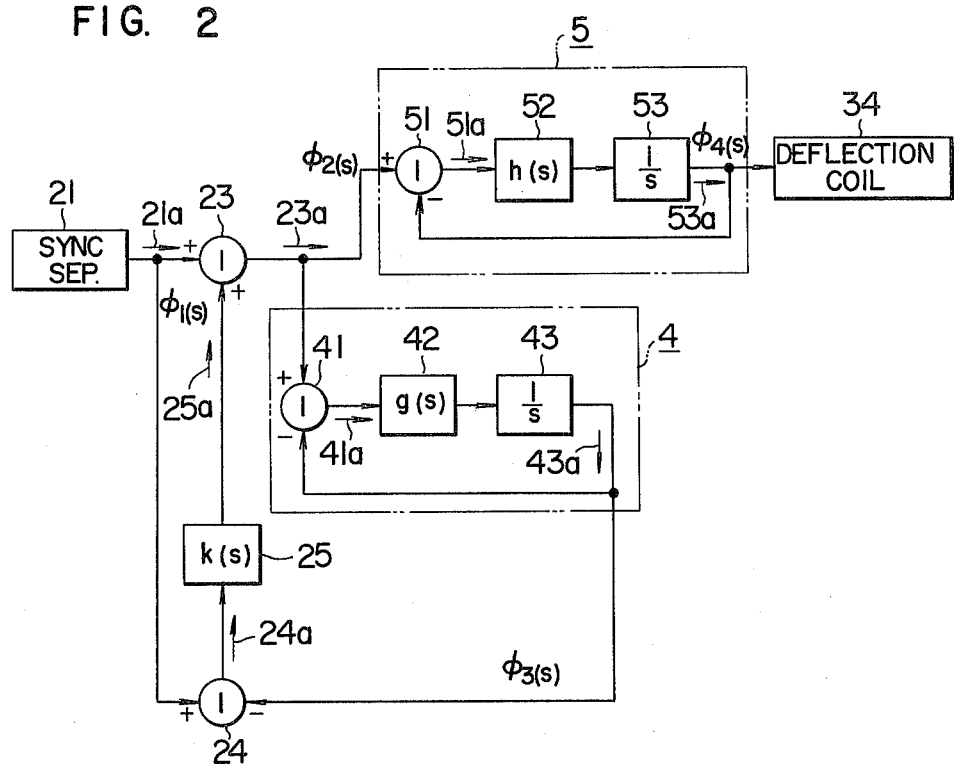
FIG. 2 is a functional block diagram of only the horizontal synchronizing signal system useful to explain the principle of this invention.

Now, it will be explained with reference to FIG. 20 how the phase fluctuation of $\phi_1(t) - \phi_4(t)$ can be decreased by the present invention. FIG. 2 is a schematic functional block diagram of the horizontal synchronizing system useful to explain the principle of the phase fluctuation compensation. In FIG. 2, circuit units and circuits corresponding to those of FIG. 1 are assigned the same reference numerals. To make better understanding of the phase relation with respect to the time axis of the horizontal synchronizing signal, a denotation of Laplace transformation parameter S is used. Proceeding with a brief explanation in comparison with FIG. 1, a horizontal synchronizing signal 21a separated from a composite video signal from the video player 1 and having a phase fluctuation $\phi_1(s)$ is applied to both the phase modulator circuit 23 and the horizontal phase difference detection circuit 24. At the horizontal phase difference detection circuit 24, the separated horizontal synchronizing signal 21a is compared in phase with an artificial horizontal deflection signal 43a delivered from the horizontal AFC circuit unit 4 having the same characteristics as that of the horizontal AFC circuit unit 5 for the television receiver set 3 thereby to produce a phase difference signal 24a. The signal 24a is turned into a modulation signal 25a while passing through the compensation circuit 25 with a transfer characteristic of K(s) and then applied to the phase modulator circuit 23 at which the horizontal synchronizing signal 21a undergoes the phase modulation in cooperation with the modulation signal 25a to produce a modulated synchronizing signal 23a. The signal 23a is then applied to the horizontal AFC circuit unit 5 for the television receiver set 3 to be compared in phase with the AFC output signal or a horizontal deflection signal 53a at the phase difference detection circuit 51, thereby producing a phase difference signal 51a. The signal 51a is in turn passed through the compensation circuit 52 having a transfer characteristic of h(s) to control the voltage controlled oscillator 53 which delivers the horizontal deflection signal 53a. The voltage controlled oscillator has a transfer characteristic of 1/s with respect to the phase of the horizontal synchronizing signal.

Simultaneously, the modulated synchronizing signal 23a is also applied to the horizontal AFC circuit unit 4 of the compensator 2 to be compared in phase with the artifical horizontal deflection signal 43a at the phase difference detection circuit 41, thereby producing a phase difference signal 41a. The signal 41a is passed through the compensation circuit 42 having a transfer characteristic of g(s) to control the voltage controlled oscillator 43 which delivers the artifical horizontal deflection signal 43a. The oscillator 43 has also a transfer characteristic of 1/s with respect to the phase of the horizontal synchronizing signal. In FIG. 2, for simplifying the explanation, the gains of the phase difference detection, phase modulation and oscillation circuits are included in g(s), k(s) and h(s), respectively.

Now, it is understood that the output $\phi_4(s)$ is related with the input $\phi_1(s)$ by the following equation, $$\phi_4(s) = \frac{h(s)}{s + h(s)} \cdot \frac{\{s + g(s)\}\{1 + k(s)\}}{s + \{1 + k(s)\}g(s)} \phi_1(s) \quad (1).$$

On the assumption that the transfer characteristic h(s) of the compensation circuit 52 of the horizontal AFC circuit unit 5 for the television receiver set 3 is made equal to g(s) of the compensation circuit 42 of the horizontal AFC circuit unit 4 included in the phase fluctuation compensator 2, the above equation (1) is $$\phi_4(s) = \frac{\{1 + k(s)\} h(s)}{s + \{1 + k(s)\} h(s)} \phi_1(s) \quad (2).$$

Accordingly, the phase fluctuation of the output picture image (image displayed on the cathode ray tube) is expressed by, $$\phi_1(s) - \phi_4(s) = \frac{s}{s + \{1 + k(s)\} h(s)} \phi_1(s) \quad (3).$$

Figure 3:
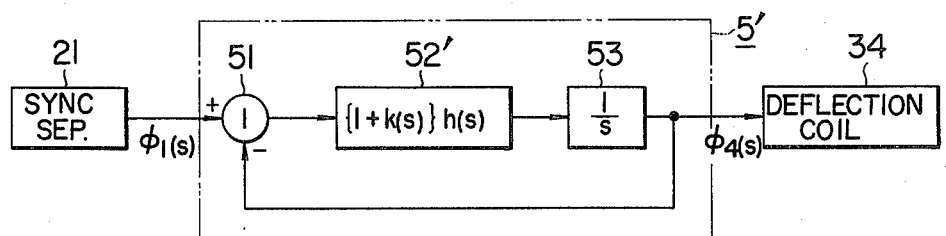
FIG. 3 is a block diagram of an equivalent circuit of the circuit shown in FIG. 2.

Consequently, the horizontal synchronizing signal system undergoing the phase fluctuation compensation constitutes, as shown in FIG. 3, an equivalent circuit having a loop gain which is $\{1 + k(s)\}$ times as large as that of the horizontal AFC circuit for the television receiver set. As understood from equation (3), in the region of phase fluctuation of low frequencies, the amount of the phase fluctuation can approximately be reduced by $$\frac{1}{1 + k(s)}.$$

Figure 5A:
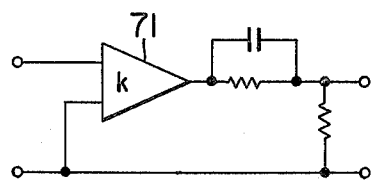
FIGS. 5a and 5b are circuit diagrams of compensation circuits exemplified for use in this invention.
Figure 5B:
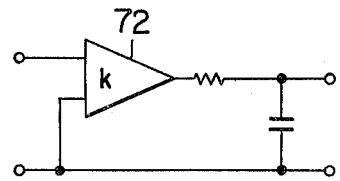
Figure 4:
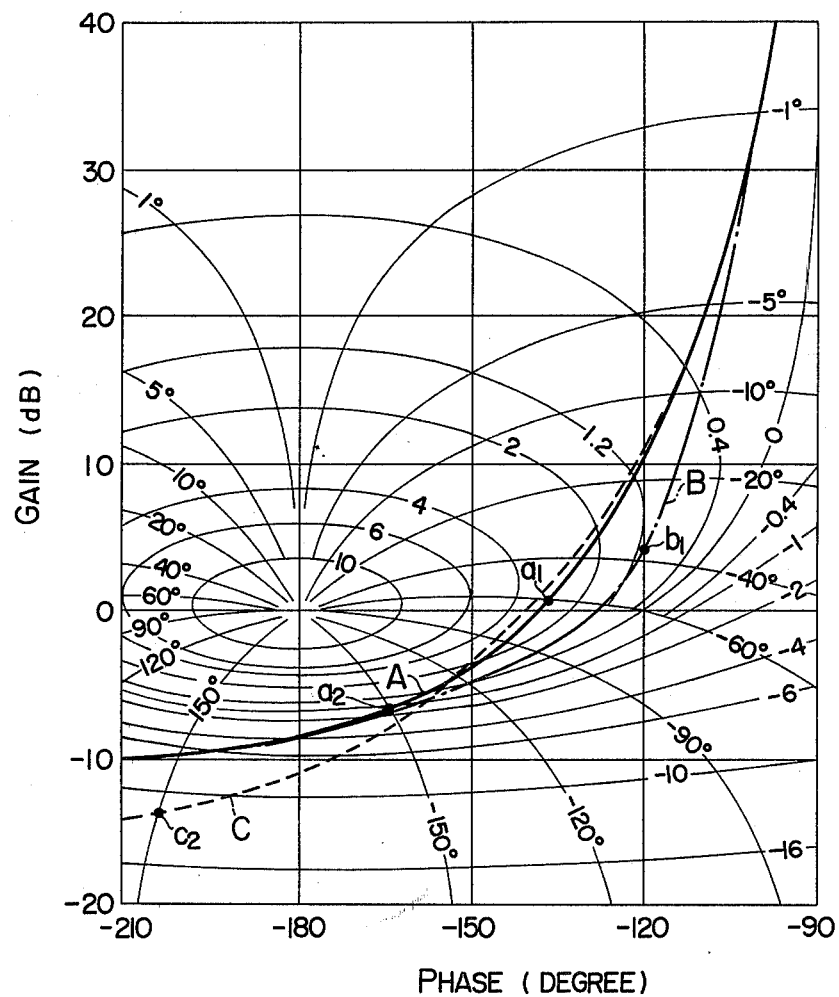
FIG. 4 is a Nichols chart showing the loop gain characteristic of a horizontal AFC circuit.

In FIG. 3, like circuit unit and circuits are designated by the same reference numerals as in FIG. 2. Additional references 5' and 52' designate an equivalent horizontal AFC circuit and an equivalent compensation circuit, respectively.

Where the phase fluctuation of the output picture image is desired to be improved to a greater extent, that is, the k(s) is desired to be increased, it is necessary to stabilize the system by providing the k(s) with a frequency compensation characteristic. Next, a measure for stabilizing the system will be described specifically. Referring to FIG. 4, there is shown therein the loop gain characteristic of the horizontal AFC circuit as drawn on a Nichols chart. In the figure, curve A designated at a solid line corresponds to the original characteristic of the horizontal AFC circuit unit for the television receiver set. If the loop gain of this circuit is simply increased, the curve A approaches to a singular point of 0 (zero) dB loop gain and $-180°$ phase, thereby the system resulting in an oscillatory condition. As a result, in a case of the reproduction of read out signal accompanied with a skew from a video tape recorder, a ringing phase fluctuation is caused on the image. However, by applying a differential compensation or an integration compensation to the k(s), a point $a_1$ on the characteristic curve A shifts to a point $b_1$ on a characteristic designated at curve B of chained line in case of the differential compensation, and a point $a_2$ on the characteristic curve A shifts to a point $c_2$ on a characteristic designated at curve C of chained line in case of the integration compensation, so that the loop gain characteristic is settled as illustrated by curve B or curve C. Accordingly, the phase margin or the gain margin is increased thereby to ensure the correspondingly stable increase in loop gain. The compensation circuit 25 is specifically exemplified as shown in FIGS. 5a and 5b for this purpose. The circuit of FIG. 5a is available for the differential compensation, and FIG. 5b is for the integration compensation. In the figures, numerals 71 and 72 each correspond to an amplifier with a gain of k.

Further, by providing, only in the low frequency region, the compensation circuit 42 of horizontal AFC circuit unit 4 included in the phase fluctuation compensator with the same characteristic as that of the horizontal AFC circuit 5 for the television receiver set 3 and by providing, on the other hand, the compensation circuit 42 with an amplitude-phase characteristic different from the above in the high frequency region, the stability of the loop can further be improved.

We claim:

1. A system for suppressing a phase fluctuation of a composite video signal accompanied therewith comprising:

means for extracting an original horizontal synchronizing signal from the input composite video signal;

means for phase modulating the original horizontal synchronizing signal extracted by said extracting means;

means including an AFC circuit unit having the same transfer characteristic as that of a horizontal AFC circuit of an ordinary television receiver set and adapted to control said phase modulating means by supplying an output signal from said phase modulating means to said AFC circuit unit, comparing in phase the output signal from said AFC circuit unit with the original horizontal synchronizing signal extracted from said extracting means and feeding back a resultant comparison signal to said phase modulating means; and means substituting the original horizontal synchronizing signal contained in the composite video signal by the horizontal synchronizing signal subjected to the phase modulation at said phase modulating means to deliver out the phase modulated horizontal synchronizing signal.

2. A phase fluctuation suppressing system for suppressing a fluctuation of a picture image produced by displacing a composite video signal accompanied with a phase fluctuation on a video monitor comprising,
   means for extracting a video signal and a synchronizing signal from an input composite video signal by separating them;
   means for phase modulating the separated synchronizing signal by a control signal applied externally;
   an AFC circuit unit having the same transfer characteristic as that of an AFC circuit of a horizontal deflection circuit provided for an ordinary television receiver set and adapted to produce a signal synchronized with the horizontal synchronizing signal modulated by said phase modulating means;
   means comparing in phase the signal delivered from said AFC circuit unit with the separated horizontal synchronizing signal and applying as a control signal a signal in response to a resultant phase difference to said phase modulating means; and
   means adding the horizontal synchronizing signal subjected to the phase modulation at said phase modulating means to the video signal separated from the composite video signal at said extracting means and applying an added signal to the video monitor.

3. The phase fluctuation suppressing system according to claim 2 wherein a circuit differentiating the input signal and delivering out a differentiated output is added to said means for applying the control signal to said phase modulating means.

4. The phase fluctuation suppressing system according to claim 2 wherein a circuit integrating the input signal and delivering out an integrating output is added to said means for applying the control signal to said phase modulating means.

* * * * *